United States Patent [19]

Uranishi et al.

[11] Patent Number: 4,659,346
[45] Date of Patent: Apr. 21, 1987

[54] DEVICE FOR PREVENTING FUEL VAPOR FROM ESCAPING TO THE OUTSIDE AIR FROM A FUEL TANK

[75] Inventors: Koji Uranishi, Susono; Takaaki Ito, Mishima; Toshio Tanahashi, Susono, all of Japan

[73] Assignee: Toyota Jidosha Kabushiki Kaisha, Aichi, Japan

[21] Appl. No.: 715,160

[22] Filed: Mar. 22, 1985

[30] Foreign Application Priority Data

Mar. 24, 1984 [JP] Japan ................................ 59-055239

[51] Int. Cl.⁴ ...................... B01D 53/04; B01D 53/14; B65D 90/28; F16K 24/04
[52] U.S. Cl. .......................................... 55/182; 55/387; 123/519; 137/587; 137/588; 220/85 VR; 220/85 VS; 220/86 R; 280/5 A; 296/1 C
[58] Field of Search ............. 220/85 VR, 85 VS, 85 S, 220/86 R; 137/587, 588; 55/387, 182; 280/5 R, 5 A; 123/519; 296/1 C

[56] References Cited

U.S. PATENT DOCUMENTS

| | | |
|---|---|---|
| 2,620,822 | 12/1952 | Peterson et al. ................. 137/588 |
| 3,478,922 | 11/1969 | Mole . | |
| 3,748,829 | 7/1973 | Joyce et al. . | |
| 3,800,978 | 4/1974 | Sigwald ........................ 220/85 VS |
| 3,854,911 | 12/1974 | Walker .......................... 123/519 X |
| 3,907,153 | 9/1975 | Mutty ............................. 55/387 X |
| 3,911,977 | 10/1975 | Berger ......................... 220/86 R X |
| 3,915,491 | 10/1975 | Montsomery ................. 280/5 A X |
| 4,312,649 | 1/1982 | Fujii et al. .................... 220/85 VS X |

FOREIGN PATENT DOCUMENTS

| | | | |
|---|---|---|---|
| 931030 | 7/1955 | Fed. Rep. of Germany ...... 137/588 |
| 2046562 | 3/1972 | Fed. Rep. of Germany ...... 137/588 |
| 2406843 | 8/1974 | Fed. Rep. of Germany ...... 123/518 |
| 908897 | 4/1946 | France .................... 220/86 R |
| 52-158214 | 12/1977 | Japan . | |
| 54-21610 | 7/1979 | Japan . | |
| 163298 | 8/1933 | Switzerland .................... 220/86 R |
| 1259732 | 1/1972 | United Kingdom ............... 137/588 |

Primary Examiner—Allan N. Shoap
Attorney, Agent, or Firm—Finnegan, Henderson, Farabow, Garrett & Dunner

[57] ABSTRACT

Disclosed is a device comprising a lid which is pivotally connected to the vehicle body and normally closes a recess formed on the vehicle body. A cap of the fuel inlet of a fuel tank is arranged in the recess. The interior of the fuel tank is connected to a canister via a normally closed control valve controlled in response to the pivotal movement of the lid. When the lid is opened, the control valve opens to connect the interior of the fuel tank to the canister.

4 Claims, 2 Drawing Figures

4,659,346

DEVICE FOR PREVENTING FUEL VAPOR FROM ESCAPING TO THE OUTSIDE AIR FROM A FUEL TANK

BACKGROUND OF THE INVENTION

1. Field of the Invention

The present invention relates to a device for preventing fuel vapor from escaping to the outside air from a fuel tank.

2. Description of the Related Art

A motor vehicle driven by an internal combustion engine is normally equipped with a fuel tank. When it becomes necessary to replenish the fuel tank with fuel, the cap attached to the fuel inlet of the fuel tank must first be detached, to allow the insertion of a fuel pump nozzle. After the fuel pump nozzle is inserted into the fuel inlet of the fuel tank, fuel is fed into the fuel tank from the fuel pump nozzle. However, when the level of the surface in the fuel tank is low, the space in the fuel tank above the surface of the liquid fuel is filled with a large amount of fuel vapor under pressure. Consequently, when the cap is detached from the fuel inlet of the fuel tank, the fuel vapor in the fuel tank is forced out of the fuel tank into the outside air, causing air pollution. In addition, when fuel is fed into the fuel tank from the fuel pump nozzle, the fuel spouted from the nozzle comes into violent contact with and agitates the fuel in the fuel tank, causing bubbles to form in the fuel in the fuel tank. The collapsing of these bubbles causes further amounts of fuel vapor to be generated in the fuel tank, and this fuel vapor also escapes from the fuel inlet of the fuel tank, causing more air pollution.

SUMMARY OF THE INVENTION

An object of the present invention is to provide a device capable of preventin pollution caused by the fuel vapor in the tank by preventing as much of the fuel vapor in the fuel tank as possible from escaping to the outside air when the cap is detached from the fuel inlet of the fuel tank.

Additional objects and advantages of the present invention will be set forth in part in the description that follows and in part will be obvious from the description or may be learned by practice of the invention. The objects and advantages of the invention may be realized and obtained by the apparatus particularly pointed out in the appended claims.

Thus, according to the present invention is provided a device for preventing fuel vapor from escaping to the outside air from a fuel tank, comprising: a vehicle body having a recess formed therein; a lid pivotally connected to the vehicle body and normally covering the recess; a fuel inlet pipe connected to the fuel tank and having a fuel inlet open to the recess; a cap detachably attached to the fuel inlet and arranged in the recess; a canister having an activated carbon therein; and, normally closed valve means controlling the vapor connection between the interior of the fuel tank and the canister and cooperating with the lid for connecting the interior of the fuel tank to the canister when the lid is opened.

The present invention may be more fully understood from the description of preferred embodiments of the invention set forth below, together with the accompanying drawings. The accompanying drawings, which are incorporated in and constitute a part of this specification, illustrate presently preferred embodiments of the invention and, together, with the description, serve to explain the principles of the invention.

DESCRIPTION OF THE PREFERRED EMBODIMENTS

Figure 1:
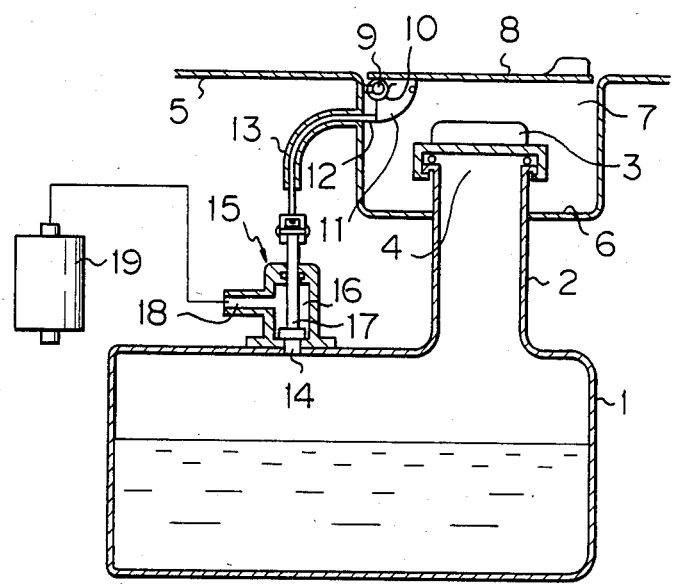
FIG. 1 is a cross-sectional side view of an embodiment of a fuel vapor escape prevention device according to the present invention.

Reference will now be made in detail to presently preferred embodiments of the invention, examples of which are illustrated in the accompanying drawings. Throughout the drawings, like reference characters are used to designate like elements.

A preferred embodiment of the device for preventing fuel vapor from escaping a fuel tank is illustrated in FIG. 1. A fuel tank 1 with a fuel inlet pipe 2 having a fuel inlet 4 and a cap 3 detachably attached thereto is shown. A recess 6 is formed in the vehicle body 5. The cap 3 is located in the recess 6, and thus the recess 6 forms a fuel filling port 7. A lid 8 covering the fuel filling port 7 is pivotally connected to the upper end portion of the side wall of the recess 6 by means of a pivot pin 9, and a coil spring 10 for continuously biasing the lid 8 towards the closed position is inserted axially around the pivot pin 9. An arm 11 is fixed to the lower wall of the lid 8, and one end of a wire 12 is connected to the lower end of the arm 11. This wire 12 extends through the interior of a bent guide 13, fixed to the vehicle body 5, and the other end of the wire 12 is connected to a valve body 17.

A fuel vapor outlet 14 is formed on the upper wall of the fuel tank 1, and a control valve 15 is arranged at the fuel vapor outlet 14. The control valve 15 has a valve chamber 16 therein, and a valve body 17 for controlling the opening operation of the fuel vapor outlet 14 is inserted into the valve chamber 16 in such a manner that the valve body 17 is able to slide up and down. The upper end of the valve body 17 is connected to the wire 12, and the valve chamber 16 is connected to a canister 19 containing charcoal via a fuel vapor passage 18.

When the lid 8 is closed as illustrated in FIG. 1, the valve body 17 of the control valve 15 closes the fuel vapor outlet 14. Consequently, at this time, the interior of the fuel tank 1 is filled with the fuel vapor under pressure. When the fuel filling operation is carried out, the lid 8 is initially opened, the cap 3 is detached from the fuel inlet 4, and then the fuel pump nozzle (not shown) is inserted into the fuel inlet 4. When the lid 8 is opened, the wire 12 is pulled upward, thus causing the valve body 17 of the control valve 15 to move upward and open the fuel vapor outlet 14. Consequently, at this time, the fuel vapor in the fuel tank 1 is fed into the canister 19 via the fuel vapor outlet 14, the valve chamber 16, and the fuel vapor passage 18. Consequently, when the cap 3 is detached from the fuel inlet 4, since a large part of the fuel vapor in the fuel tank 1 has been fed into the canister 15, an extremely small amount of the fuel vapor escapes from the fuel inlet 4 to the outside air. The fuel vapor fed into the canister 19 is absorbed by the activated carbon in the canister 19, and the fuel vapor absorbed by the activated carbon is drawn into the intake manifold (not shown) via the fuel vapor conduit (not shown) at a predetermined engine operating state.

Figure 2:
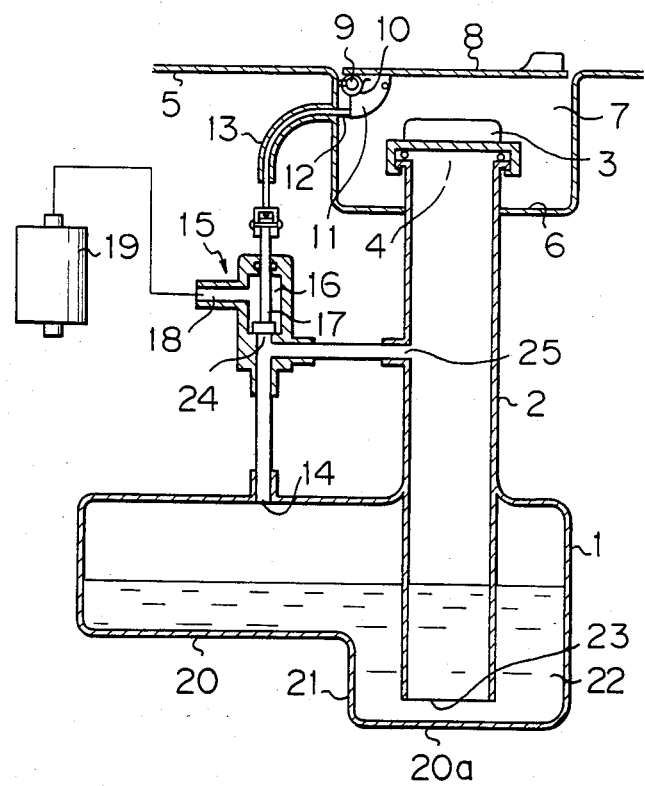
FIG. 2 is a cross-sectional side view of an alternative embodiment according to the present invention.

FIG. 2 illustrates an alternative embodiment of the present invention. In this embodiment, a portion 20a of the bottom wall 20 of the fuel tank 1 is expanded downward, and a small chamber 22 surrounded by the vertical wall 21 of the fuel tank 1 is formed above the expanded portion 20a. The fuel inlet pipe 2 extends downward in the fuel tank 1 to the interior of the small chamber 22, and the fuel outlet 23 of the fuel inlet pipe 2 is open to the interior of the small chamber 22. In addition, in this embodiment, the control valve 15 has a valve port 24 which is selectively closed or opened by the valve body 17. This valve port 24 is connected to the fuel vapor outlet 14, and to a fuel vapor outlet 25 which is open to the upper interior of the fuel inlet pipe 2.

In this embodiment, when the lid 8 is opened, and thus the valve body 17 opens the valve port 24, the fuel vapor in the fuel inlet pipe 2 in addition to the fuel vapor in the fuel tank 1 is fed into the canister 19 via tha valve port 24, the valve chamber 6, and the fuel vapor passage 18. Therefore, the amount of fuel vapor escaping from the fuel inlet 4 to the outside air when the cap 3 is detached becomes extremely small. Then the fuel pump nozzle is inserted into the fuel inlet 4, and fuel is fed into the fuel tank 1. At this time, if the fuel spouted from the fuel pump nozzle comes into violent contact with the fuel tank 1, the entire content of fuel in the fuel tank 1 is caused to bubble and vaporize. However, in this embodiment, since the fuel inlet pipe 2 extends to the interior of the small chamber 22, if the small chamber 22 is filled with fuel, the fuel fed from the fuel pump nozzle comes into violent contact with the fuel located in the fuel inlet pipe 2. Consequently, at this time, only the fuel located in the fuel inlet pipe 2 forms bubbles and vaporizes, and thus the amount of fuel vapor generated by bubbling is small. Where the fuel remains only in the bottom portion of the small chamber 22, the entire amount of fuel in the small chamber 22 bubbles and vaporizes when the fuel is fed from the fuel pump nozzle. However, the volume of the small chamber 22 is small, and thus the amount of fuel vapor generated by the bubbling is small. Consequently, since the amount of fuel vapor generated when the fuel is fed into the fuel tank 1 from the fuel pump nozzle is small, and since a part of the fuel vapor thus generated is fed into the canister 19, the amount of fuel vapor escaping from the fuel inlet 4 to the outside air becomes extremely small.

According to the present invention, when the cap 3 is detached, the fuel vapor in the fuel tank 1 is fed into the canister 19 and the fuel vapor generated in the fuel tank 1 when the fuel filling operation is carried out is also fed into the canister 19. Therefore, it is possible to reduce the amount of fuel vapor escaping from the fuel inlet 4 to the outside air when the lid 3 is detached and the fuel filling operation is carried out. Thus, it is possible to prevent air pollution caused by the fuel vapor.

While the invention has been described by reference to specific embodiments chosen for purposes of illustration, it should be apparent that numerous modifications could be made thereto by those skilled in the art without departing from the basic concept and scope of the invention. Thus, it is intended that all matter contained in the foregoing description or shown in the accompanying drawings shall be interpreted as illustrative and not in a limiting sense.

We claim:

1. A device for preventing fuel vapor from escaping to the outside air from a fuel tank, comprising:
    a vehicle body having a recess formed thereon;
    a lid pivotally connected to said vehicle body and normally covering said recess;
    a fuel inlet pipe connected to the fuel tank and having a fuel inlet open to said recess, said fuel inlet pipe extending to a bottom interior of said fuel tank;
    a cap detachably attached to said fuel inlet and arranged in said recess;
    a canister having activated carbon therein;
    a control valve having a valve port connected to an upper interior portion of the fuel tank and connected to an upper interior portion of said fuel inlet pipe, said valve port connecting both the interior of said fuel tank and the interior of said fuel inlet pipe to said canister;
    a valve body mounted in said control valve, said valve body connected to said lid to cooperate with said lid to close said valve port when said lid is closed and to open said valve port when said lid is opened.

2. A device according to claim 1, wherein said lid has an arm formed thereon, and said valve body is connected to said arm via a wire.

3. A device according to claim 2, further comprising a bent guide fixed onto said vehicle body, said wire extending through said bent guide.

4. A device according to claim 1, wherein said fuel tank has a small chamber expanding downward from a bottom wall of said fuel tank, said fuel inlet pipe extending to an interior of said small chamber.

* * * * *